(12) United States Patent
Dickens et al.

(10) Patent No.: US 9,936,154 B2
(45) Date of Patent: Apr. 3, 2018

(54) DIGITAL VIDEO AND DATA TRANSMISSION

(71) Applicant: Adder Technology Limited, Cambridge (GB)

(72) Inventors: Nigel Anthony Dickens, Cambridge (GB); William David Haylock, Cambridgeshire (GB); Peter Howarth Maydew, Cambridgeshire (GB); Douglas Gilchrist Reid, Milton (GB)

(73) Assignee: Adder Technology Limited, Cambridge (GB)

( * ) Notice: Subject to any disclaimer, the term of this patent is extended or adjusted under 35 U.S.C. 154(b) by 298 days.

(21) Appl. No.: 14/163,908

(22) Filed: Jan. 24, 2014

(65) Prior Publication Data
US 2014/0211095 A1    Jul. 31, 2014

(30) Foreign Application Priority Data

Jan. 28, 2013 (GB) .................................. 1301489.9
Aug. 29, 2013 (GB) .................................. 1315412.5

(51) Int. Cl.
*H04N 5/38* (2006.01)
*H04N 21/4363* (2011.01)
*H04N 7/10* (2006.01)

(52) U.S. Cl.
CPC ............... *H04N 5/38* (2013.01); *H04N 7/108* (2013.01); *H04N 21/43632* (2013.01); *H04N 21/43635* (2013.01)

(58) Field of Classification Search
CPC ....... H04N 21/43632; H04N 21/43635; H04N 5/38; G06F 3/1454; G09G 2370/04

USPC ..... 348/723, 720, 725, 423.1, 473; 370/464, 370/537, 529, 522
See application file for complete search history.

(56) References Cited

U.S. PATENT DOCUMENTS 7,295,578 B1    11/2007   Lyle et al.
8,776,163 B2 *   7/2014   Cirstea .................. H04N 7/102
                                                                 710/65
2012/0210385 A1  8/2012   Cirstea et al.

FOREIGN PATENT DOCUMENTS

GB    2 350 039    11/2000
WO    00/16306    3/2000

OTHER PUBLICATIONS

International Search Report dated Jul. 16, 2014 from International Application No. GB1315412.5.

* cited by examiner

*Primary Examiner* — Michael Lee
*Assistant Examiner* — Jean W Desir
(74) *Attorney, Agent, or Firm* — Beyer Law Group LLP

(57) ABSTRACT

Apparatus and methods for transmitting digital video data and auxiliary data over a four twisted wire pair cable, and systems using such apparatus, are described. A first, second and third digital video color signal and a digital video timing signal are transmitted using differential mode signalling over a first, second, third and fourth twisted wire pair of a cable. Auxiliary data is sent over a data channel using common mode signalling over a first pair of the four twisted wire pairs of the cable. A common mode choke can be used to add or remove a signal sent using the common mode signalling from a pair of wires also used to transmit one of the digital video color or digital video timing signals.

38 Claims, 10 Drawing Sheets

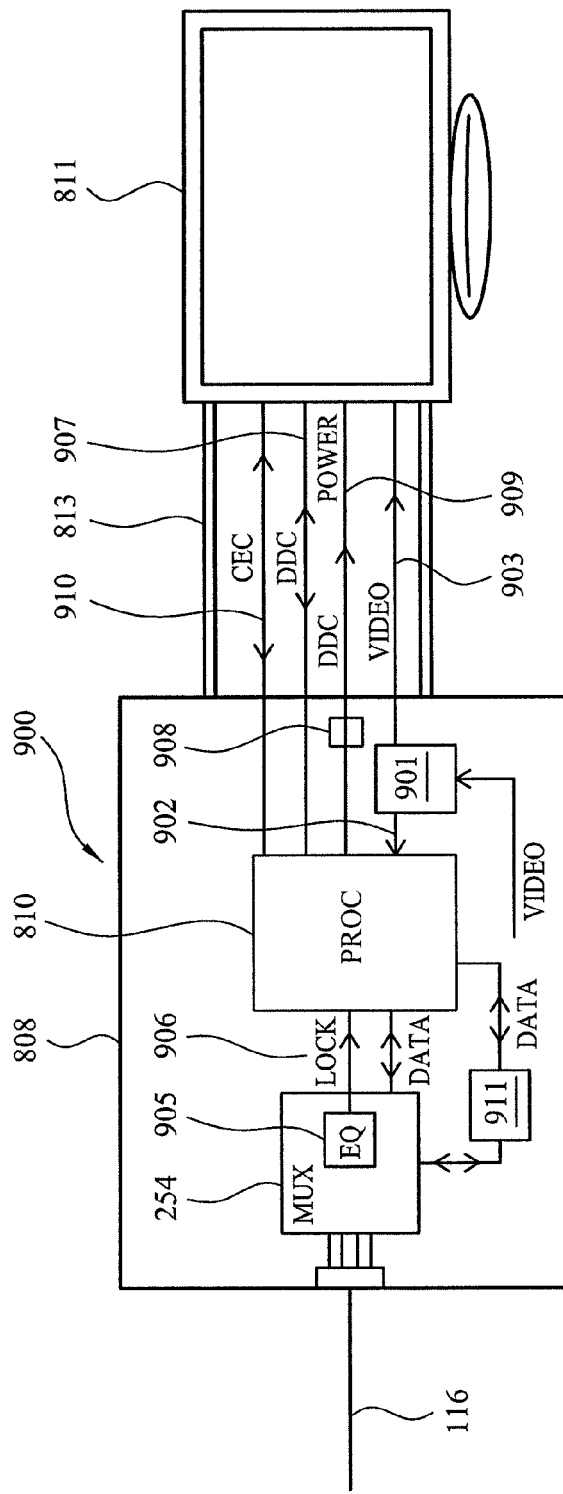
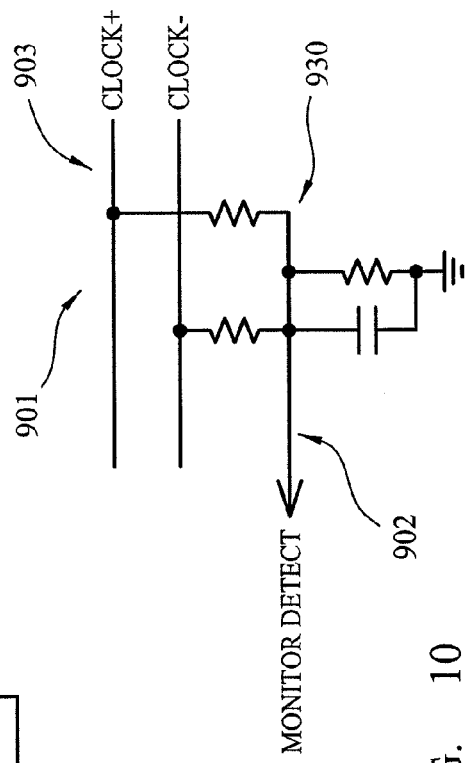
FIG. 9
FIG. 10

DIGITAL VIDEO AND DATA TRANSMISSION

This application claims priority to GB Application No. 1301489.9, filed Jan. 28, 2013, and GB Application No. 1315412.5, filed Aug. 29, 2013, both of which are hereby incorporated by reference.

BACKGROUND OF THE INVENTION

The present invention relates to the transmission of data between a computer and remote peripherals and in particular to the transmission of digital video data together with other data over a twisted pair cable.

DESCRIPTION OF RELATED ART

There are a large number of applications in which it is desirable to be able to transmit video data and other data from a computer to a display and other peripheral devices which are remote to the computer. Various products exist which allow this and are generally referred to as extenders. They typically include a transmitter device proximate the computer for receiving video data output by the computer and for passing data to and from the computer's peripheral ports. A receiver device is proximate the display and peripherals and outputs video data for viewing on the display and also passes data to and from the peripheral devices. It is preferred to be able to connect the transmitter and receiver using a standard four twisted wire pair cable.

It is relatively easy to transmit analog video data and peripheral data over reasonable distances, e.g. 50 m, using a standard four twisted pair cable. However, it is more difficult to transmit digital video data over practicably useful distances owing to the greater amount of data that needs to be transmitted and also to avoid any disruptions to the digital video data which would result in failure of the image to be displayed. Some digital video standards, such as HDMI and DVI, use three colour signals (red, green and blue) and a clock signal, or other timing signal, which is used to re-constitute the image.

Hence, a four twisted wire pair can be used to send each of the three digital colour signals and the digital clock signal as differential signals on one of each of the four twisted wire pairs. However, as all four twisted wire pairs are being used to transmit the digital colour and clock signals, there is no channel available for a peripheral data transmission channel. Obviously a fifth twisted wire pair could be used to provide a data channel, but standard industry standard CATx cables and RJ-45 connectors only have four twisted wire pairs.

It would therefore be beneficial to be able to transmit digital video data over a four twisted wire cable while also providing a data channel over the same cable.

BRIEF SUMMARY OF THE INVENTION

A first aspect of the invention provides apparatus for transmitting digital video data and auxiliary data over a twisted wire pair cable, comprising: a transmitter including differential mode circuitry arranged to transmit a first, second and third digital video colour signal and a digital video timing signal as differential mode signals over a first, second, third and fourth twisted wire pair of the cable; and a receiver including differential mode circuitry arranged to receive the differential mode signals, and wherein the transmitter and the receiver further include common mode circuitry arranged to provide a data channel for sending auxiliary data between the transmitter and the receiver using common mode signalling over a first pair of the four twisted wire pairs of the cable.

The invention allows an auxiliary data channel to be provided on top of four digital video signals, by using differential mode signalling to send the four digital video signals over four twisted wire pairs and using common mode signalling over two of the twisted wire pairs at the same time. It has been found that it is possible to use common mode signalling to provide the data channel for sending non-video data without disturbing the transmission of the video data sent using differential mode signalling. Hence, it is possible to send both digital video and auxiliary data over the same four twisted wire pairs.

The transmitter and/or the receiver can include circuitry for adding and/or removing signals sent using common mode signalling to a line also being used to send signals by differential mode signalling. The circuitry can comprise one or a plurality of common mode chokes. Each common mode choke can be arranged to add and/or remove auxiliary data signals from the first pair of twisted wire pairs.

The transmitter can include at least two common mode chokes. Each common mode choke can be connected to a different pair of lines arranged to transmit different ones of the digital video colour signals and the digital video clock signal.

The transmitter can include four common mode chokes. Each common mode choke can be connected to a different pair of lines arranged to transmit different ones of the digital video colour signals and the digital video clock signal.

The receiver can include at least two common mode chokes. Each common mode choke can be connected to a different pair of lines arranged to receive different ones of the digital video colour signals and the digital video clock signal.

The receiver can include four common mode chokes. Each common mode choke can be connected to a different pair of lines arranged to receive different ones of the digital video colour signals and the digital video clock signal.

The or each common mode choke can be wired in anti-phase.

The apparatus can further comprise a respective inductor connected between the or each common mode choke and a signal line. The inductor can be arranged to handle signals having a different frequency to signals handled by the common mode choke. The inductor can handle signals having a higher frequency than the signals handled by the common mode choke. The inductor can handle signals having a lower frequency than the signals handled by the common mode choke.

The apparatus can further comprising a respective resistor and capacitor network coupled between the or each common mode choke and ground. The resistor and capacitor network can be arranged to reduce the effect of stray reactances. The respective resistor and capacitor networks can be further arranged to reduce ringing and/or improve signal integrity The common mode circuitry of the transmitter can be further arranged to send a power signal using common mode signalling. The power signal can be sent over a second pair of the four twisted wire pairs of the cable different to the first pair.

Each of the transmitter and/or the receiver can include four pairs of lines for handling a respective one of the digital video colour and digital video timing signals.

Each pair of lines can be AC coupled. Each line of each pair of lines can include a capacitive element to provide AC coupling.

Each pair of lines can include at least one reflected signal absorbing component or network. Each line of each pair of lines can include a resistive element or network arranged to absorb at least some of the signal reflected back along the cable to be used with the apparatus. The transmitter can include back termination resistors.

The receiver can include pull down resistors. The pull down resistors can be arranged to preserve the DC voltage levels of signals on the or each twisted pair at the receiver.

The common mode circuitry can be arranged to provide a USB data channel. The USB data channel can transmit data extracted from an original USB data signal or signals. Either or each of the transmitter and the receiver can include circuitry arranged to extract data from an original USB data signal and pass the extracted data to the common mode circuitry for transmission over the auxiliary data channel.

Either or each of the transmitter and the receiver can include circuitry arranged to receive data from the common mode circuitry and to reconstitute a USB data signal including the received data.

The auxiliary data can be digital rights management data. The auxiliary data can be HDCP data. The auxiliary data channel can transmit data using an i2c protocol.

The digital video data can be HDMI or DVI.

The apparatus can further comprise a four twisted wire pair cable connected between the transmitter and receiver. The cable can be permanently connected between the transmitter and receiver or releasably connected between the transmitter and receiver.

The transmitter can include a cable connector and/or the receiver can include a cable connector. A first end of the cable can include a first cable connector and a second end of the cable can include a second cable connector. The first and second cable connectors can be RJ45 connectors. The transmitter cable connector and/or the receiver cable connector can be RJ45 sockets.

The cable can be a CATx cable. In particular the cable can be a CAT5, CAT5e, CAT6 or CAT7 cable. These can be used to provide useful extension distances for High Definition digital video signals, although CAT6 and CAT7 give better results. The cable can include shielding and in particular shielding between the individual twisted wire pairs. CAT6 and CAT7 cables that incorporate shielding between the individual pairs can provide longer extension distances owing to reduced crosstalk between the signals travelling on the separate pairs. Cables with thicker wire gauges will also generally provide longer extension distances.

The cable can has a length of at least 40 m, preferably at least 50 m, more preferably at least 60 m and even more preferably at least 80 m. For example, it is possible to extend HD 1080p (1920×1080×60 Hz) digital video signals up to 40 m using Cat 6 23AWG cable, up to 60 m using Cat 7 26AWG cable and up to 80 m using Cat 7A 23AWG cable.

A second aspect of the invention provides apparatus according to the preceding aspect, and any preferred features thereof, and further comprising: a further transmitter; and a switching device. The transmitter and further transmitter can each be connected to the switching device by respective further four twisted wire pair cables. The receiver can be connected to the switching device by the twisted wire pair cable. The switching device can include a many input, one output switch.

A third aspect of the invention provides apparatus according to the first aspect of the invention, and any preferred features thereof, and further comprising: a further transmitter; a further receiver; and a switching device. The transmitter and further transmitter can each be connected to the switching device by respective further four twisted wire pair cables. The receiver can be connected to the switching device by the twisted wire pair cable and the further receiver can be connected to the switching device by a yet further four twisted wire pair cable. The switching device can include a many input, many output switch, for example, a switching matrix.

A fourth aspect of the invention provides apparatus according to the first aspect of the invention, and any preferred features thereof, and further comprising a further receiver. The transmitter can include a video splitter arranged to splitting the digital video signal into separate digital video signals for transmission to each of the receivers.

Each of the receivers can be configured to interrogate an attached display device to determine one or more attributes relating to the status of the device. Each receiver can further be configured to transmit the determined attribute to the transmitter over the auxiliary data channel.

The one or more attributes can be selected from any combination or all of the following: whether a cable is connected to the display; whether the display is powered on; whether the a currently selected input port of the display is the port to which digital video data is being delivered; and whether the display is in standby mode.

Each receiver can further comprise video lock circuitry to determine whether a video signal is being reliably received from the transmitter.

Each receiver can further comprise monitor detection circuitry to determine whether a display device is connected to the receiver.

A fifth aspect of the invention provides a signage system comprising: a data processing device including a signage application; a first display device; a second display device; and apparatus according to the fourth aspect of the invention and any preferred features thereof. The transmitter can be connected to the data processing device, the first display can be connected to the receiver and the second display can be connected to the further receiver.

A sixth aspect of the invention provides a system comprising: at least one source of digital video data; at least one sink of digital video data; and apparatus according to any preceding aspect of the invention, and any preferred features thereof, wherein one source is connected to the, or each, transmitter, and one sink is connected to the, or each, receiver. The or each source can be a computer. The or each source can be a media player. The sources can be different types of devices. The or each sink can be a digital display device.

A seventh aspect of the invention provides a method for transmitting digital video data and auxiliary data over a four twisted wire pair cable, comprising: transmitting a first, second and third digital video colour signal and a digital video timing signal using differential mode signalling over a first, second, third and fourth twisted wire pair of a cable; and sending auxiliary data over a data channel using common mode signalling over a first pair of the four twisted wire pairs of the cable.

The method can further comprise sending a power signal using common mode signalling over a second pair of the four twisted wire pairs of the cable.

The data channel can provide a data channel for USB data.

The data channel can provide a data channel for digital rights management data.

The method can further comprise using a common mode choke to add or remove a signal sent using the common mode signalling from a pair of wires also used to transmit one of the digital video colour or digital video timing signals.

BRIEF DESCRIPTION OF THE DRAWINGS

An embodiment of the invention will now be described in detail, and by way of example only, with reference to the accompanying drawings, in which:

FIG. 9 shows a schematic block diagram of a further embodiment of a receiver part of the signage system shown in FIG. 8;

FIG. 10 shows a circuit diagram of a monitor detection circuit of the receiver shown in FIG. 9;

Similar items in the different Figures share common reference signs unless indicated otherwise.

DETAILED DESCRIPTION OF THE DRAWINGS

Figure 1:
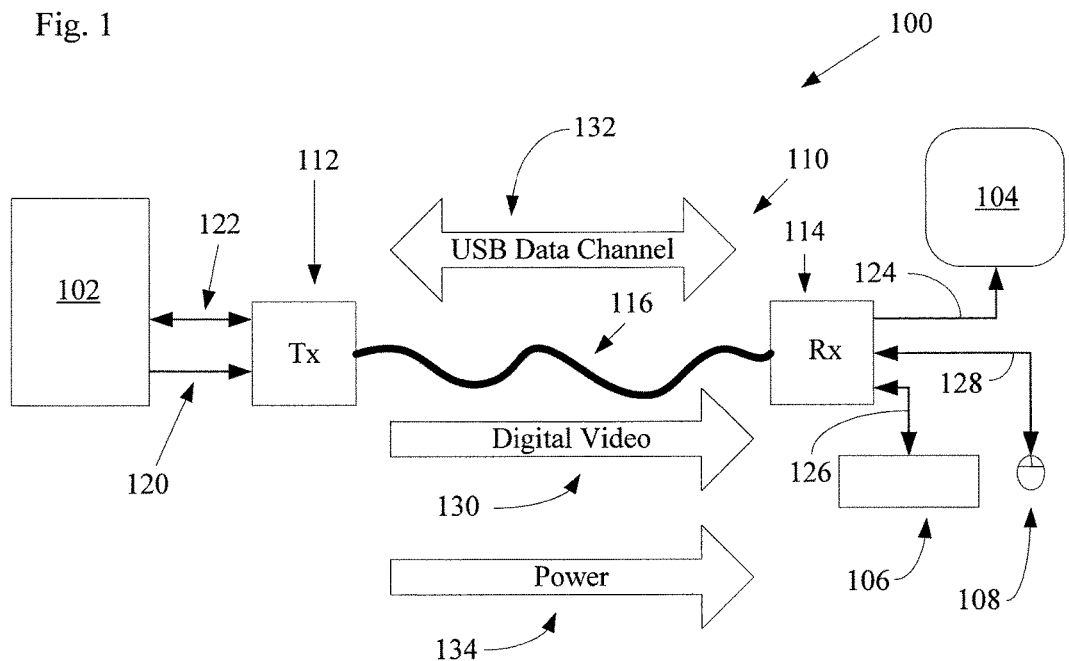
FIG. 1 shows a schematic block diagram of a computer system including apparatus according to the invention.

With reference to FIG. 1 there is shown a schematic block diagram of a computer system 100 according to the invention and in which the data transmission apparatus of the invention can be used. The computer system 100 includes a computer 102, a digital video display device 104 (such as a digital computer monitor), a USB keyboard 106 and a USB mouse 108. The data transmission apparatus 110 of the invention includes a transmitter 112, a receiver 114 and a cable 116 connected between the transmitter and receiver. The cable is a conventional four twisted wire pair cable (such as those generally referred to as CATx cables) with a standard RJ45 connector at a first end and a standard RJ45 connector at a second end, by which the cable can be connected to a transmitter cable connector of the transmitter and a receiver cable connector of the receiver. The cable can have a length of approximately 50 m.

The computer 102 acts as a source of digital video data and has a digital video output which is connected by a video cable 120 to a digital video input connector of the transmitter 112. The digital video output will generally include three different colour digital video signals (e.g. one for each of red, green and blue) and also a digital video clock or timing signal. Common digital video connector standards include HDMI and DVI, both of which use three digital video colour signals and one digital video timing signal and in particular use transition minimized differential signalling (TMDS) to transmit the at least four digital video signals.

The computer 102 also acts as a source and sink of non-video data, such as peripheral data, and one or more peripheral connectors are connected by one or more USB cables 122 to a data connector of the transmitter. As represented by double headed arrow 122, the non-video data may pass from and to the computer 102, whereas digital video pixel data is only transmitted from computer 102. However, the HDMI and DVI interfaces also include bi-directional video signals, such as the Display Data Channel (DDC) link for transferring the display EDID information, or the Consumer Electronic Control Link (HDMI only).

The digital display device 104 acts as a sink of digital video data and has a digital video input which is connected by a video cable 124 to a digital video output connector of the receiver 114. The input peripheral USB devices 106, 108 acts as a source and sink of USB data, and each is connected by a respective USB cable 126, 128 to a data connector of the receiver. As represented by double headed arrows 126, 128, the non-video data may pass from and to the keyboard 106 and mouse 108, whereas digital video pixel data is only received by display device 104 (although as mentioned above the HDMI and DVI interfaces can include some bi-directional signalling of non-pixel data).

As described in greater detail below, the data transmission apparatus of the invention provides a digital video communication channel 130 over which the high frequency digital video signals (three colour signals and one clock signal) are transmitted from the computer 102 to the display device 104 using four of the twisted wire pairs of cable 116. At the same time, an auxiliary data communication channel 132 is provided allowing the bi-directional transfer of non-video data (in this example a USB data channel between USB devices) using twisted pairs of the cable which are simultaneously providing the digital video channel 130. Optionally, the apparatus can also provide a power channel 134 over which an electrical power signal can be transmitted to the receiver 114 to power the receiver 114. The power channel also uses twisted pairs of the cable which are simultaneously providing the digital video channel 130. Hence, the invention allows digital video data and auxiliary data, and optionally electrical power, to be simultaneously transmitted using only four twisted wire pairs.

Figure 2:
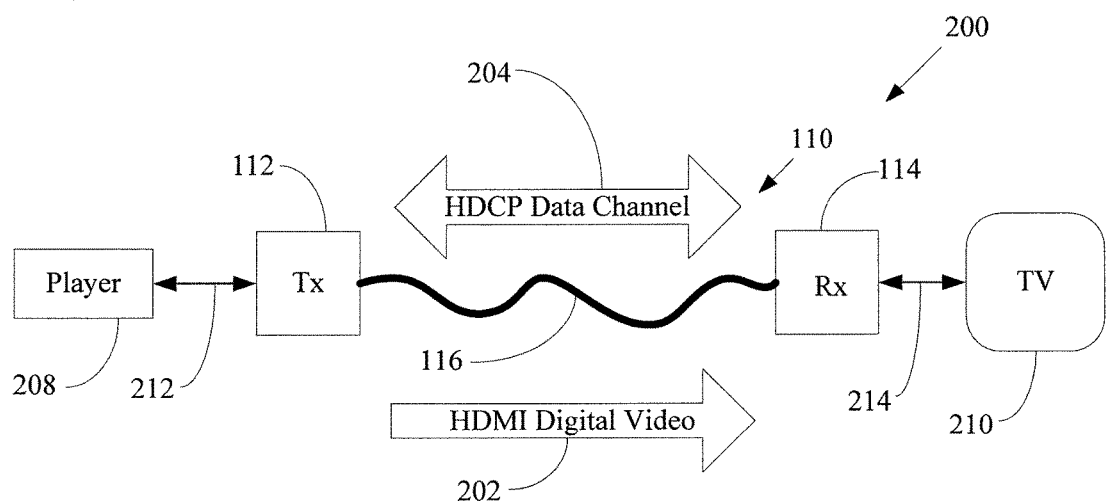
FIG. 2 shows a schematic block diagram of a media system including apparatus according to the invention.

FIG. 2 shows a second embodiment of a system 200, also according to the invention, in which the data transmission apparatus 110 of the invention can be used. In this embodiment, system 200 is a media system and the data transmission apparatus is used to transmit audio and digital video data over a digital video channel 202 from a source of media 208 to a sink of media 210. HDMI audio is encoded within the video blanking periods and so is carried together with the video signals on the differential pairs. The apparatus does not need to decode these signals which are simply passed from the source to the sink along with the video.

The auxiliary data channel 204 is used to transmit data used by a digital rights management protocol between the sink 208 and source 210. In the illustrated media system 200, the source of digital media data can be a video player which outputs digital media data using HDMI and is connected by a HDMI lead 212 to the transmitter 112. The sink of digital media data 210 can be a digital television which also uses the HDMI interface and is connected by a HDMI lead 214 to the receiver.

The auxiliary data channel 204 is used to transmit data required by the high bandwidth digital copy protection (HDCP) system which is a form of digital rights management to prevent copying of the digital media data. In particular, the data transmission apparatus implements the HDCP channel as an inter-integrated circuit (i2c) bus between the transmitter 112 and receiver 114.

Transmitter 112 implements a HMDI receiver and receiver 114 implements a HDMI transmitter. The transmitter 112 first receives the HDMI signal before transmitting it on and so appears like an HDMI receiver or sink to the media player. The receiver 114 first receives the video signal before transmitting it on using the HDMI link cable and so it looks like an HDMI transmitter or source to the display device 210. The HDCP source is the media player 208 and the HDCP sink is the digital TV 210. HDCP operates between the HDCP source and the HDCP sink and the HDMI extender apparatus 110 sits between the HDCP source 208 and HDCP sink 210 and consists of the HDMI transmitter unit 112, the HDMI receiver unit 114 and the length of CATx cable 116 connecting them together.

HDCP establishes and maintains an encryption scheme by exchanging information between the source 208 and sink 210. This is performed over HDMI by using i2c register reads and writes over the DDC bus in the HDMI cable 212, 214. The HDCP specification provides tight timing restrictions on some operations, the most significant being a 1 ms response time to a periodic read request, which is used to verify that the cyphers are still in step at both ends. This read request occurs approximately every 2 seconds and the response must be received within 1 ms of issuing the read request.

The HMDI extender apparatus 110 emulates these i2c operations as follows. A microprocessor within the HDMI transmitter 112 receives i2c operations from the HDCP source 208 over the HDMI cable 212. Software running on the microprocessor within the HDMI transmitter 112 is informed as each i2c sub operation occurs. An i2c sub operation is sending or receiving of start or stop bits and sending or receiving of bytes of data. The sub-operations are communicated to a microprocessor within the HDMI receiver 114 over the auxiliary data channel 204 simultaneously with the digital video signals over the HDMI digital video channel 202, via the twisted wire pairs of the CATx cable.

The HDMI receiver 114 receives these messages and sends the corresponding i2c operations to the HDCP sink, TV 210. Where the operations have responses these are sent back to the HDMI transmitter 112 over the HDCP data channel 204 and the transmitter passes the response on to the HDCP source, player 208.

The transactions are split into two types:

A) i2c Read Operations

1) An i2c start bit and i2c address byte are received in the HDMI transmitter 112 from the HDCP source 208, this causes a START message containing the i2c address to be sent to the HDMI receiver 114 which causes an HDMI start bit and address to be sent to the HDCP sink 210.

2) The HDMI receiver 114 reads the first byte from the HDCP sink 208 and this is sent as a DATA message over data channel 204 to the HDMI transmitter 112, which is waiting for the message. This byte is sent to the HDCP source 208 over i2c.

3) The HDMI receiver 114 continues to read data from the HDCP sink 210 and send it to the HDMI transmitter 112.

4) When the HDCP source 208 has received enough data it indicates this, via an i2c stop bit, to the HDMI transmitter 112. The HDMI transmitter 112 sends a STOP message to the HDMI receiver 114 which sends a stop bit and terminates the i2c operation.

B) i2c Write Operations

1) An i2c start bit and i2c address byte are received in the HDMI transmitter 112 from the HDCP source 208, this causes a START message containing the i2c address to be sent to the HDMI receiver 114 which causes an HDMI start bit and address to be sent to the HDCP sink 210.

2) The first data byte is received over i2c from the HDCP source 208 in the HMDI transmitter 112 and is sent as a DATA message to the HDMI receiver 114 and on to the HDCP sink 210.

3) Subsequent data bytes are received form the HDCP source 208 and sent across the HDCP channel 204 and on to the HDCP sink 210.

4) When a stop bit is received, a STOP message is sent to the HMDI receiver 114 and the stop bit is passed on to the HDCP sink 208, which terminates the operation.

The above scheme works for all operations that do not have the very tight timing requirement. However is not guaranteed to meet the 1 ms timing requirement. The following scheme is used to read the registers which have tight timing requirements. The HDMI receiver 114 reads the registers from the HDCP sink 210 at variable intervals. When a change in the values is detected a message is sent by the HDMI receiver 114 to the HDMI transmitter 112 containing the new value of the registers. The HDMI transmitter 112 stores the values locally. When the HDCP source 208 performs a read on these registers it is handled differently by the HDMI transmitter 112. Instead of passing the request on, the HDMI transmitter 112 handles the request locally and returns the values of the registers which were last sent to it by the HDMI receiver 114.

This allows the HDMI transmitter 112 to respond immediately to the HDCP source 208, and well within the 1 ms timing restriction. The interval used by the HDMI receiver 114 to poll the registers of the HDCP sink is variable. As the HMDI receiver 114 learns when to expect changes it can tune the polling intervals for efficiency. The HDMI receiver 114 initially polls the registers with a high frequency, to detect the change. When the HDMI receiver 114 has learnt the frequency and phase of the change it can reduce its polling interval to only read the registers at the time it expects the registers to change.

Hence, in the media system 200, the auxiliary data channel 204 is used to implement a digital rights management system simultaneously with the transmission of digital video data over the digital video channel 202 using only four twisted wire pairs of the CATx cable 116.

Figure 3:
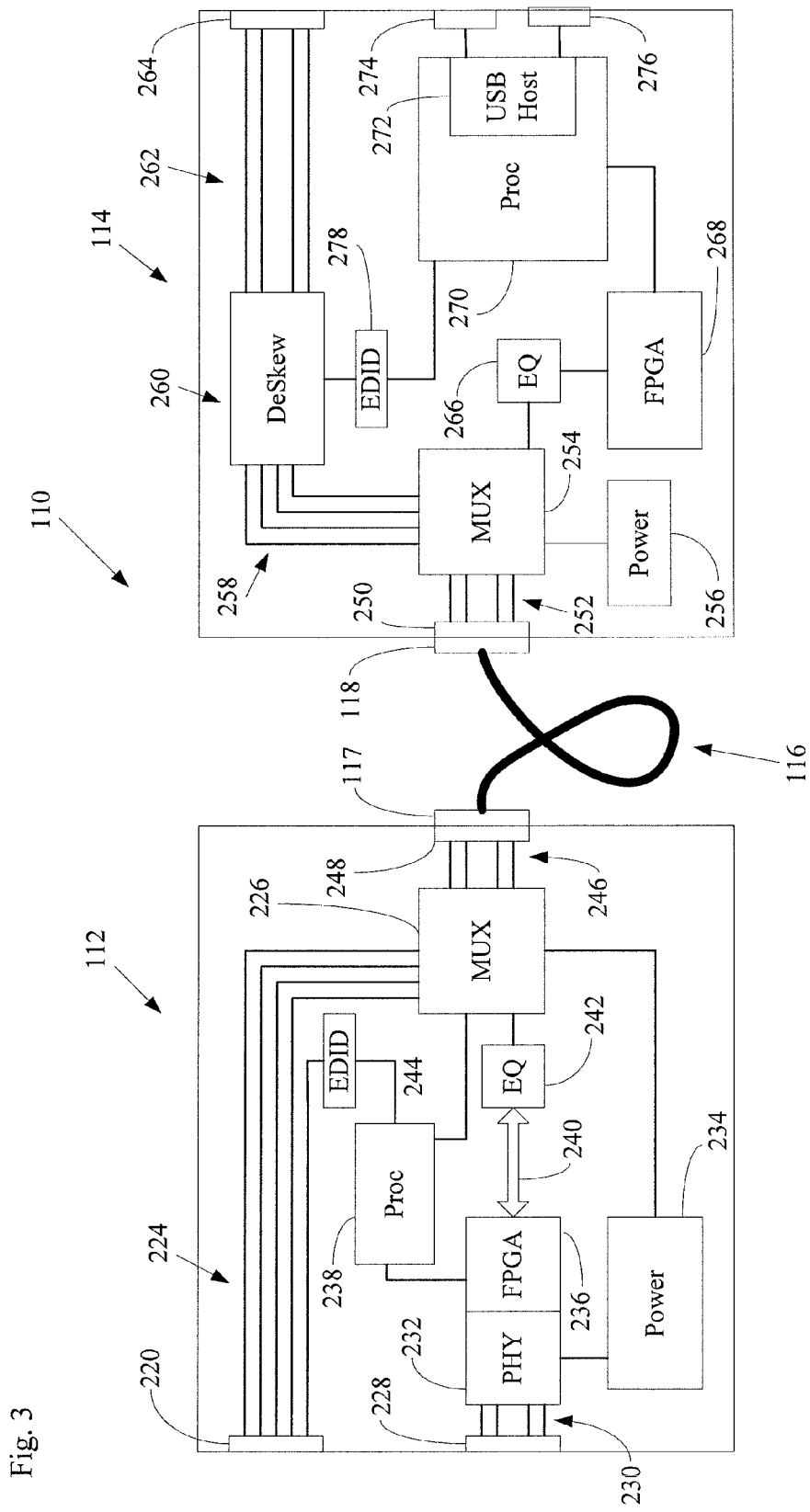
FIG. 3 shows a schematic block diagram of the transmitter, cable and receiver parts of the apparatus shown in FIG. 1.

FIG. 3 shows a schematic block diagram of the data transmission apparatus 110 of the invention in greater detail. The apparatus includes the transmitter 112 and the receiver 114 connected by a 50 m length of CATx cable 116. The CATx cable 116 includes a first RJ45 cable connector 117 at a first end and a second RJ45 connector 118 at a second end.

The specification of the CATx cable contributes to the extension distance that can be achieved. The receiver includes an equaliser which is very efficient at recovering a video signal that has been attenuated by travelling down a long distance cable but cannot recover the video signal if the video signal has suffered too greater a level of attenuation or distortion. For unshielded CATx cables, the applicant has discovered that the extension distance achievable is generally determined by the crosstalk between the twisted wire pairs. For CATx cables with individually shielded twisted wire pairs, the crosstalk is minimised and the applicant has discovered that the extension distance achievable is then generally determined by the attenuation of the cable. Assuming similar construction characteristics, cables with thicker conductors generally exhibit lower attenuation and therefore can deliver longer extension distances. For best results the cable will be a CAT6 or CAT7 specification cable with individual shields around each twisted pair. For example, the applicant has discovered that extension distances up to 60 m are achievable using a Uninet 7702 Flex 4P Cat7 S/FTP 26AWG cable, available from Datwyler Cables GmbH (UNINET is a trade mark which is registered in some countries), which has individual shields for each twisted pair. The longer extension distances of up to 80 m can be achieved using a Uninet 7120 4P Cat7A S/FTP 23AWG cable, available from Datwyler Cables GmbH, which has relatively thick wires and a low attenuation. Extension distances of up to 50 m have great usefulness in practical applications and so this is normally the performance target that is aimed for by extension devices.

The transmitter 112 includes a video input connector 220, which may be, for example, a female mini DisplayPort connector. The video input connector 220 is connected to a multiplexer 226 by four pairs of lines 224, each pair for routing a respective one of the three colour digital video signals and the one digital video clock signal. A further pair of lines 225 is provided in communication with circuitry 244 for supplying an EDID data signal.

The transmitter 112 also includes a data connector 228, such as a USB connector. The data connector 228 is connected by four pairs of lines 230 to provide the four signals used by USB (Voltage (Vcc), Data+, Data−, Ground) to a PHY chip 232 which bridges between the digital and modulated parts of the USB interface. The PHY chip extracts the power signal (Vcc) from the USB signals and passes that via any power conditioning or processing circuitry 234 to the multiplexer 226. Although not shown in FIG. 3 for the sake of clarity, the power circuitry 234 also provides electrical power and voltage rails to the other devices and parts of the transmitter 112. The PHY chip 232 includes, or is connected to, an FPGA 236 which is programmed to provide true USB emulation and operates in conjunction with a microprocessor 238. True USB emulation processes the USB signals and passes on the data while emulating on the USB port the full range of behaviour and characteristics that a connected computer would expect to see from USB devices (and vice versa), such that it appears that the computer is connected directly to the USB peripheral. True USB emulation is implemented by FPGA 236 and processor 238. The implementation of true USB emulation is generally known in the art and is exemplified in the AdderLink Infinity, AdderLink Infinity Dual, AdderView Pro and Adder Command and Control switch available from Adder Technology Ltd.

Transmitter 112 also includes circuitry 244 including a memory for storing display related data used by the Extended Display Identification Data (EDID) standard which is a data structure provided by a digital display to describe its capabilities to a video source. The data permits the computer 102 to know what kind of monitor 104 is connected to it. Processor 238 can store EDID data items in memory 244 which can be supplied by lines 225 to appropriate pins on the video connector 220 so that the computer 102 can access EDID data for the remotely connected monitor 104. In simpler embodiments, the EDID data can be fixed data that represents a general display that declares support for the common video standards that are likely to be used (such as HD 1080p). In more complicated embodiments, the EDID data can be collected from the connected display 104 by the receiver 114 and communicated to the transmitter circuit 112 over the data channel 132. In some cases it is advantageous for the microprocessor 238 to parse the EDID data collected from the display to ensure that video modes that the display can support but that are not supported by the extension equipment are not communicated to the computer as supported modes.

The data extracted from the USB signals is then passed over a bus 240 via equalization circuitry 242 which can provide fixed equalization to data signals received at the transmitter 112 from receiver 114. The data signals are then passed to the multiplexer 226 which combines the four digital video signals, the two USB derived data signals and the power signal and transmits them over the four twisted wire pairs of the cable 116. Multiplexer 226 can act to combine the data signals and power signal with the digital video signals for transmission to the transmitter over the same four twisted wire pairs. Multiplexer 226 also acts to separate out data signals received from the receiver 114 simultaneously with transmitting the power signal and digital video signals, as the data channel 132 is bi-directional. MUX 226 outputs the digital video signals, data signals and power signal over four pairs of lines 246 to an RJ45 socket connector 248.

Receiver 114 includes an RJ45 socket connector 250 which is connected by at least four pairs of lines 252 to a multiplexer 254. Multiplexer 254 acts to separate the received video signals, the received power signal and any received data signals. Hence, multiplexer 254 also acts as a demultiplexer to an extent, as does multiplexer 226. Multiplexer 254 also acts to add any data signals to be transmitted to transmitter 112 to the twisted wire pairs of the cable simultaneously with receiving the video and power signals. Receiver 114 includes power supply and conditioning circuitry 256 which receives the power signal from multiplexer 254 and supplies power and voltage rail signals to the other circuits and components of the receiver 114. In other embodiments, the receiver circuitry 114 may be powered from a locally provided power source or by a mixture of line power and a locally provided power source.

Multiplexer circuit 254 includes a video equaliser that recovers the video signal from the attenuated video signal that is received at the connector 250. As discussed in greater detail below, the applicant has found that the MAX3815 chip (available from Maxim Integrated) operates as a particularly effective equaliser for video signals with pixel rates up to 165 mega pixels per second, which is the maximum rate for single link DVI signals and supports common HD resolutions (such as 1080p). Multiplexer 254 supplies the four digital video signals (three colour signals and one clock signal) via four pairs of lines 258 to a deskew circuit 260 which can act to remove any colour signal skew, i.e. relative timing differences, between the three colour signals. Deskew circuit 260 is connected by at least four pairs of lines 262 to a digital video output connector, e.g. a DVI or HDMI connector, to which the monitor 104 is connected by digital video cable 124. Multiplexer 254 passes the extracted data signals of the auxiliary data channel, in this instance corresponding to the Data+ and Data− signals that represent the extracted USB data used to implement a USB true emulation scheme, to a fixed equalizer which can apply any appropriate equalization to the received data signals. The equalized data signals are then passed to an FPGA 268, which handles the data signalling protocol on the auxiliary communication channel together with FPGA 236, and which works in co-operation with processor 270 to provide the receiver-end part of the true USB emulation.

Processor 270 includes a USB host 272 which is connected to a first USB port 274 and a second USB port 276. Processor 270, USB host 272 and FPGA 268 hence act together to emulate all the characteristics of a computer such that a USB device attached to either of the USB port acts as though attached directly to the computer. USB host 272 receives the transmitted data signals and presents them as the USB data+ and data− signals on either of the USB ports 274, 276. When the receiver 114 is acting to transmit data over the auxiliary channel 132, it will be appreciated that the USB host receives the USB data, which is then extracted and passed by processor and FPGA 268 to multiplexer 254 for transmission over cable 116 to multiplexer 226 where it is extracted from the twisted pairs and equalized by equaliser 242 to counteract the effects of cable attenuation. The received data is then passed to an element of FPGA 236 that is programmed to implement the signalling protocol across the cable 116. The received data is then passed to the processor 238 which co-operates with a second element of the FPGA 236 which is programmed to provide USB hub functionality and enables the processor 238 to emulate multiple USB devices simultaneously. Thus, the microprocessor 238 cooperates with the FPGA 236 to provide the transmitter-end functionality of the true USB emulation scheme.

Receiver 114 also includes memory 278 which stores EDID data received from monitor 104 via connector 264. Deskew circuit 260 can also include circuitry to receive any EDID signal sent by monitor 104 via video connector 264 and store the EDID data in memory 278. Processor 270 can then read the EDID data stored in memory 278 and transmit the EDID data to transmitter 112 by encoding and sending the EDID data over the auxiliary data channel 132 during a period when USB data is not being transferred or alternatively multiplexed with USB data on the auxiliary channel. The processor 238 of the transmitter 112 can then receive and store the EDID data in local memory 244. The EDID data can then be output on the appropriate pins of video input connector 220 and be read by computer 102. Hence, EDID data can be transmitted from the display to the computer to take advantage of the benefits thereof even though the computer and monitor are not directly connected.

Figure 4:
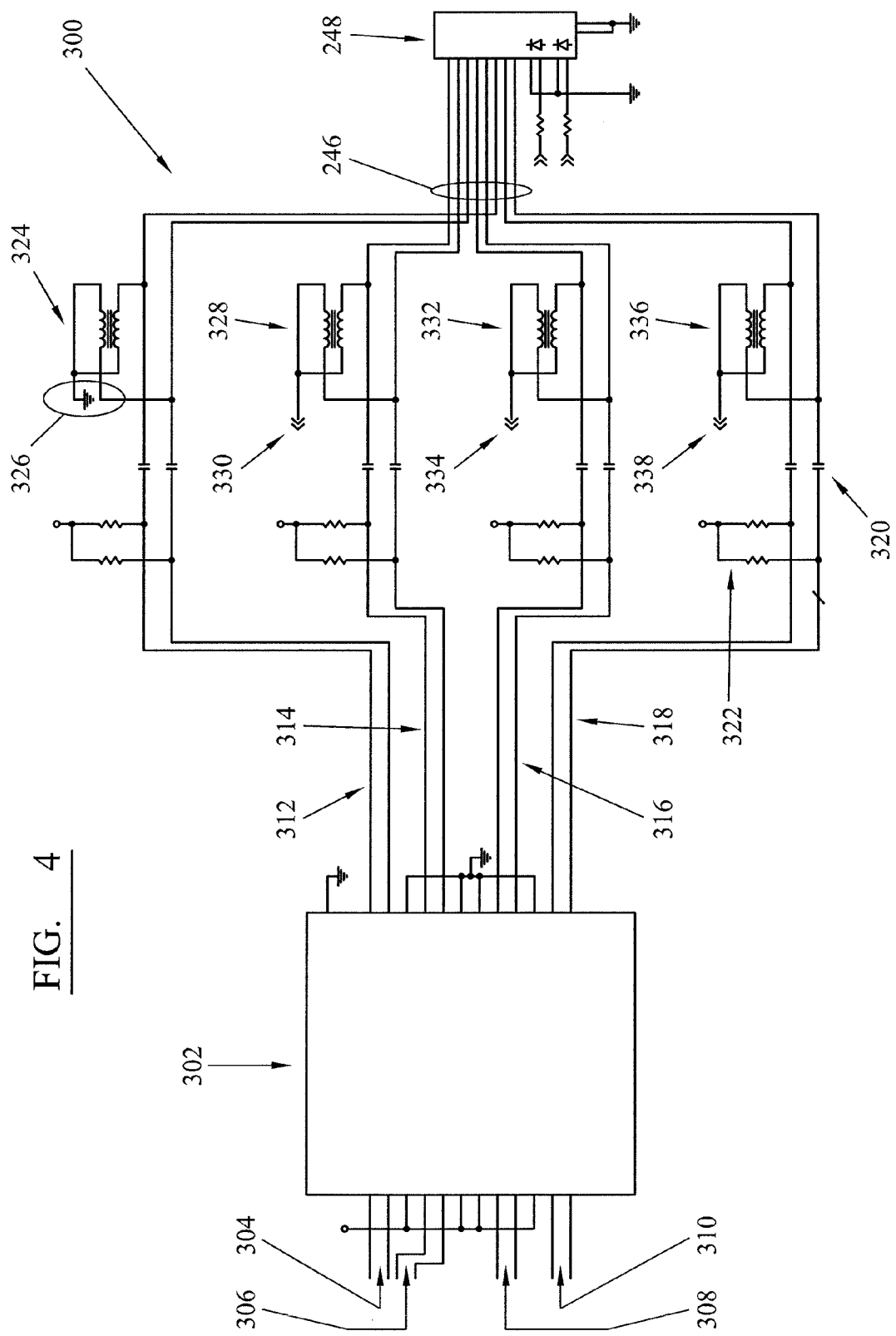
FIG. 4 shows a schematic circuit diagram of a multiplexer part of the circuitry of the transmitter for handling common mode signals and differential mode signals.
Figure 5:
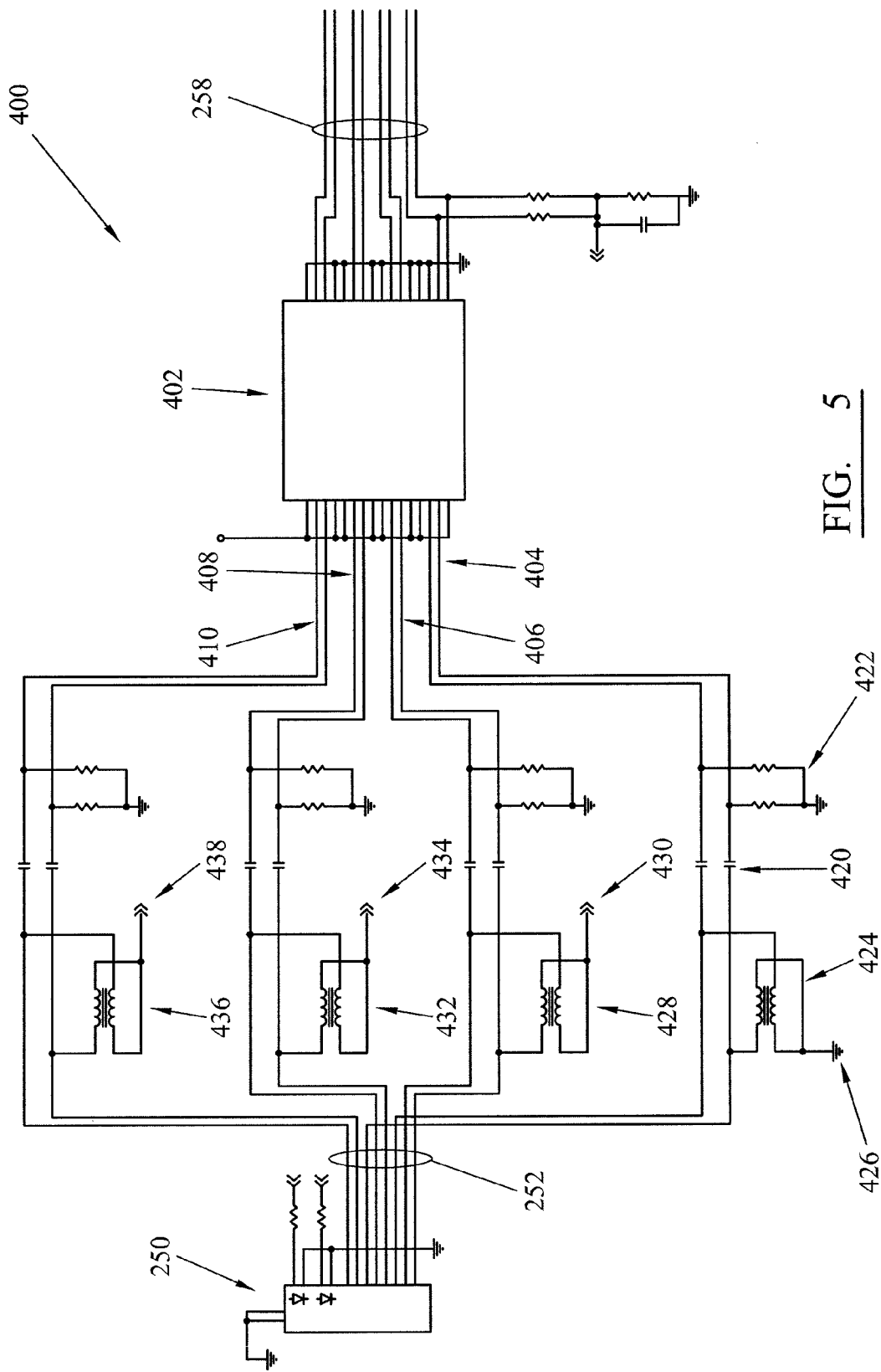
FIG. 5 shows a schematic circuit diagram of a multiplexer part of the circuitry of the receiver for handling common mode signals and differential mode signals.

The multiplexer 226 of the transmitter is shown in greater detail in FIG. 4 and the multiplexer 254 of the receiver is shown in greater detail in FIG. 5. Various details of the circuits shown in FIGS. 4 and 5 have been omitted so as not to obscure the invention, but will be apparent to the skilled addressee from the teachings herein.

FIG. 4 shows part of the circuitry 300 of multiplexer 226 of the transmitter 112. Multiplexer circuitry 300 includes an integrated circuit 302 which provides equalizer, re-timing and line driver functions. It receives the three digital colour data signals as TMDS signals on three pairs of lines 306, 308, 310 and also the clock signal on a fourth pair of lines 304. The transmitter equalizes the signals for transmission over the cable and includes differential line drivers that output the digital clock signal as a TMDS signal on a first pair of lines 312, and the three colour signals as TMDS signals on a second 314, third 316 and fourth 318 pairs of lines connected to pins on the RJ45 socket 248. A suitable device for the equalizer and line driver device 302 is the DS22EV5110 Extended Reach Equalizer available from Texas Instruments, Inc. Hence, the clock, red, green and blue digital video signals can be sent respectively down a first, second, third and fourth twisted wire pair of the cable (connected respectively to pins 3 & 6, 1 & 2, 4 & 5 and 7 & 8 of socket 248).

Each pair of video signal lines 312, 314, 316, 318, includes a pair of capacitors, each connected in series, e.g. capacitors 320, which act to AC couple the communication channel provided by the pair of lines.

Each pair of video signal lines is also connected to a pair of resistors 322 in parallel which act as 'pull up' resistors at the transmitter (and counterpart 'pull down' resistors 422 are provided at the receiver). Although resistors 322 can be thought of as pull-up resistors, at first sight they are not required since the receiver circuitry 400 already performs that pull-up function. However, these additional 'pull-ups' 322 are back termination resistors which serve to absorb reflections which may arise from discontinuities in the signal transmission lines. Similarly, the pull-down resistors, e.g. 422, which are placed at the terminating end of the twisted pairs serve to ensure that the correct DC levels are preserved at the input of the receiving device 402. When used as an HDMI receiver, such devices are intended to be DC coupled to the transmitter. However in the invention, the devices are AC coupled, meaning that the input can 'float' higher than the intended voltage rail of the device. This would reduce the device's tolerance to conditions such as voltage differences between the transmitter and receiver which may be caused by influences such as mains earth currents.

A common mode choke wired in antiphase is connected to each of the pair of lines 312, 314, 316, 318. A first common mode choke 324 is connected to ground 326. A second common mode choke 328 is connected to the Data− signal 330. A third common mode choke 332 is connected to the electrical power signal 334. A fourth common mode choke 336 is connected to the Data+ signal 338. A common mode choke connected in antiphase looks like a high impedance to differential signals and so they will effectively block any differential signals. Each common mode choke is used to input, or output, a signal on a one of the lines 246.

A common mode choke wired in anti-phase provides a different impedance to differential and common mode signals and so provides a means by which a common mode signal of reasonable bandwidth may be inserted onto the pair of conductors without significantly affecting the differential mode signal that is being carried on the same pair of conductors. The differential mode impedance of the choke is high enough to avoid loading of the differential mode signal whilst at the same time the common mode impedance of the choke is low enough to allow the injection and recovery of the common mode signal. The common mode choke is arranged such that its differential mode impedance remains sufficiently high up to the bandwidths of the differential mode video signals to be transmitted.

Common mode impedances of twisted pairs within CATx cables vary somewhat dependent upon the construction and whether they are shielded or not. The termination network impedance is therefore chosen to be an average value of typical cable types in an attempt to absorb reflected signals. This value may typically be about 50 ohms, although for longer cables the value may typically be about 100 ohms.

Hybrid line termination resistor networks are well known in the art that subtract the transmitted signal from the received data signal and thus enable transceivers to signal across a pair of conductors in both directions at the same time (i.e. full duplex communication). For hybrids to work effectively the resistor values must be chosen to match the impedance of the cable. As common mode impedances can vary between cables, a hybrid approach is generally not suitable unless the equipment is designed to be used with a certain specification of cable only. For this reason, it is preferable for the signalling protocol to be arranged so that data is transmitted over the data channel in half duplex mode in one direction at a time. A suitable time is left between switching the transmission direction to allow for signal reflections to die down before a signal is transmitted in the opposite direction. This approach has the advantage that it works reliably across a range of cables with varying common mode impedances. A suitable half-duplex circuit is described in greater detail below with reference to FIG. 13.

The Data+ signal 338 is applied to the fourth common mode choke 336 and the Data− signal 330 is applied to the second common mode choke and can be transmitted as a common mode signal across the fourth twisted wire pair and the second twisted wire pair without interrupting the differential mode signalling of the red and blue video signals. The power signal 334 is applied to the third common mode choke 332 and ground 326 is applied to the first common mode choke 324 and can be transmitted as a common mode signal over the third and first twisted wire pair without interrupting the differential mode signalling of the green and clock video signals.

With the aid of signal equalisation applied at both ends the common mode signals can be used to transmit data at a rate of up to around 20 Mb/s, which exceeds the rate of 12 Mb/s used by full speed USB. The video clock signal for DVI, for example, has a frequency of up to 165 MHz and the video data signal has a frequency of up to 1.65 Gb/s.

As illustrated in FIG. 5, the circuitry 400 of multiplexer 254 of the receiver has a similar structure to that of the transmitter. Multiplexer circuitry 400 includes an integrated circuit 402 which provides an equalizer function for received differential inputs. Equalizer chip 402 receives the red, green and blue digital data signals as TMDS signals on three pairs of lines 406, 408, 410 and also the clock signal on a fourth pair of lines 404. The receiver equaliser compensates the signals received over the cable 116 to signal levels suitable for use by the monitor 104 and includes drivers to output TMDS video and clock signals on lines 258. A suitable device for the equalizer and line driver device 402 is the MAX3815 TMDS Digital Video Equalizer available from Maxim Integrated. Hence, the clock, red, green and blue digital video signals can be received, boosted and output by the receiver 114.

Similarly to the transmitter, each pair of video signal lines 404, 406, 408, 410 includes a pair of capacitors, each connected in series, e.g. capacitors 420, which act to AC couple the communication channel provided by the pair of lines.

Each pair of video signal lines is also connected to a pair of resistors 422 in parallel which act as a 'pull down' resistors at the receiver (and are counterparts to the 'pull up' resistors at the transmitter).

A common mode choke wired in antiphase is connected to each of the pair of lines 404, 406, 408, 410. A first common mode choke 424 is connected to ground 426. A second common mode choke 428 is connected to the Data− signal 430. A third common mode choke 432 is connected to the electrical power signal 434. A fourth common mode choke 436 is connected to the Data+ signal 438. Each common mode choke is used to input, or output, a signal on a one of the lines 252.

The fourth and second common mode chokes 438, 430 are used to extract the Data+ 438 and the Data− signal 430 which has been received as a common mode signal across the fourth twisted wire pair and the second twisted wire pair. The third and first common mode chokes 432, 426 are used to extract the power signal which has been received as a common mode signal over the third and first twisted wire pair.

Hence, the data signals and power signals can be received and supplied to the fixed equaliser 266 and power circuitry 256 respectively. The equaliser circuit includes a differential line driver and receiver circuit that launches a differential signal and receives a differential signal. The data+ and data− signals are each communicated as common mode signals on two different pairs of conductors. The differential signal is therefore carried as the difference between the common mode voltages of two pairs of conductors. A fixed amount of high frequency signal boost is applied to the received differential signal to compensate for the loss in the cable and the attenuation of the common mode choke injection circuit. A suitable transceiver that supports data rates of up to 20 Mb/s is the ISL3177E provided by Intersil.

It will be appreciated that the video data and power data are only ever received by the receiver 114. However, as the auxiliary data channel is bi-directional, common mode chokes 436 and 428 can also be used to inject the Data+ and Data− signals onto the twisted wire pairs as a common mode signal and the Data+ and Data− signals are then extracted by the corresponding common mode chokes 338, 330 of the transmitter 112.

The characteristic impedance of twisted pair of conductors within a standard CATx cable is typically 100 ohms and the differential line drivers of the equaliser chips are typically connected to their local voltage rails by two 50 ohm resistors, thereby presenting a termination impedance of 100 ohms to an arriving signal. It is well known that no signal reflection will occur if a perfect cable pair with a characteristic impedance of 100 ohms is terminated by its characteristic impedance.

Although FIGS. 3, 4 & 5 describe an embodiment in which the auxiliary data channel is a USB data channel, as illustrated in FIG. 2 and as described above, the invention can also be used to provide other types of data channels and to connect different types of sources and sinks of digital video data. It will be apparent to a person of ordinary skill in the art, based on the teaching herein, how to adapt the transmitter and receiver in order to provide an auxiliary data channel which can be used to transmit digital rights management data between the transmitter and the receiver.

Figure 6:
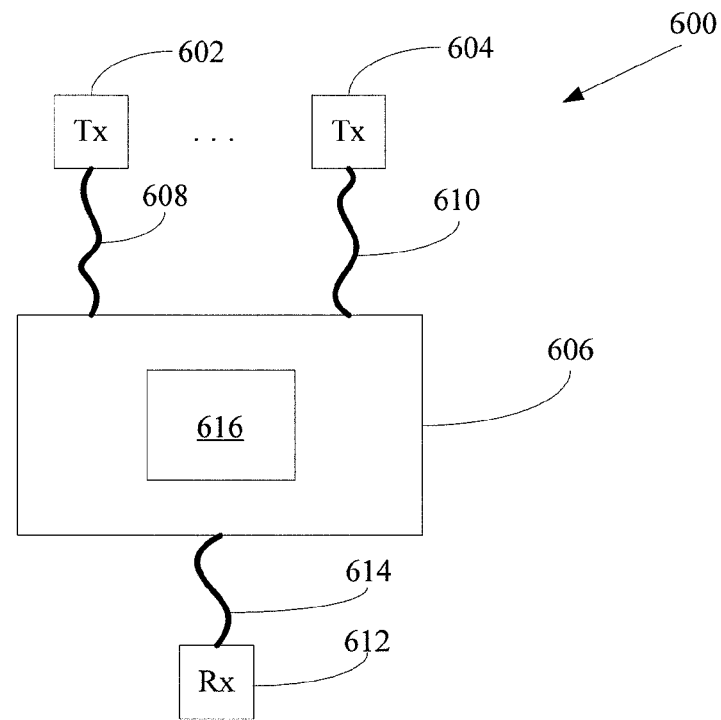
FIG. 6 shows a schematic block diagram of switching apparatus also according to the invention.

FIG. 6 shows a further embodiment of data transmission apparatus 600 according to the invention. Data transmission apparatus 600 allows one of multiple sources of digital video data to be selected. Apparatus 600 includes a plurality of transmitters, e.g. first 602 and second 604 transmitters, each connected to a switching device 606 by a respective four twisted wire pair cable 608, 610. A single receiver 612 is also connected to switch 606 by a further four twisted wire pair cable 614. It will be appreciated that the transmitters 602, 604 and receiver 612 are generally the same as those described above. Switching device 606 includes a switch 616, and ancillary control electronics, which can be operated by a switching signal to provide a signal path connecting a one of the plurality of transmitters 602, 604 to the receiver 612, so that receiver 612 can selectively receive digital video data from, and have an auxiliary data channel with, a currently selected one of the transmitters.

It will be appreciated that a variety of different source of digital video data can be attached to transmitters 602, 604 and that a variety of different sinks of digital video data can be attached to receiver 612. For example a different computer can be connected to each of transmitter 602, 604 and at least a digital display device can be connected to receiver 612 so that a user can select to view locally a video image being generated by a one of the plurality of remote computers.

Figure 7:
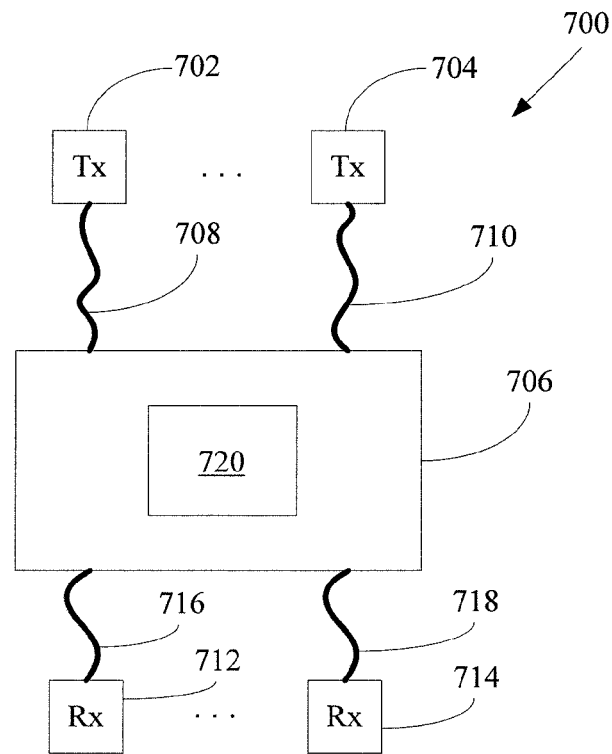
FIG. 7 shows a schematic block diagram of further switching apparatus also according to the invention.

FIG. 7 shows a further embodiment of data transmission apparatus 700 according to the invention. Data transmission apparatus 700 allows multiple different sources of digital video data to be transmitted to multiple different sinks of video data. Apparatus 700 includes a plurality of transmitters, e.g. first 702 and second 704 transmitters, each connected to a switching device 706 by a respective four twisted wire pair cable 708, 710. A plurality of receivers, e.g. first 712 and second 714 receivers, are also connected to switch 706 by a further respective four twisted wire pair cables 716, 718. It will be appreciated that the transmitters 702, 704 and receivers 712, 714 are generally the same as those described above. Switching device 706 includes a matrix switch 720, and ancillary control electronics, which can be operated by a switching signal to provide a signal path connecting any one of the plurality of transmitters 702, 704 to any one of the plurality of receivers 712, 714 so that any one of the receivers can selectively receive digital video data from, and have an auxiliary data channel with, a currently selected one of the plurality of transmitters.

It will be appreciated that a variety of different source of digital video data can be attached to transmitters 702, 704 and that a variety of different sinks of digital video data can be attached to receivers 712, 714. For example a different computer can be connected to each of transmitters 702, 704 and at least a digital display device can be connected to each of receivers 712, 714 so that a user can select to view locally on a particular one of a plurality of displays a video image being generated by a one of the plurality of remote computers.

Figure 8:
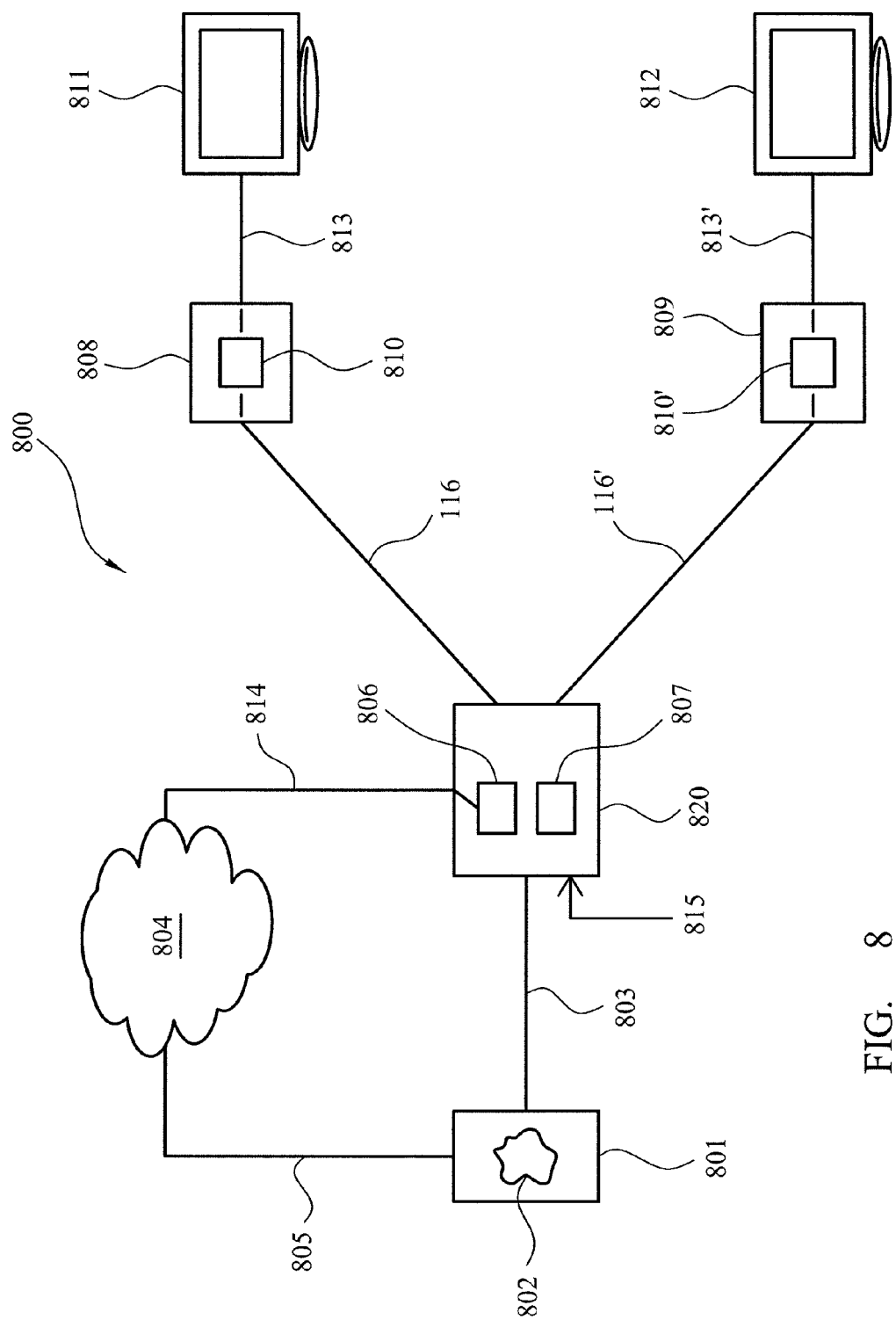
FIG. 8 shows a schematic block diagram of a signage system also according to the invention.

FIG. 8 shows a schematic block diagram of a signage system 800 according to the invention and in which a further embodiment of the data transmission apparatus of the invention can be used. The data transmission apparatus described above can also provide a particularly elegant and cost effective solution to a requirement that exists in the digital signage field.

In such applications it is often desirable to send the video signal from a computer or media player to one or more displays that are acting as digital signs. A video extender that uses CATx cable offers a convenient solution as that avoids the need to place the computer or media player immediately adjacent the display or displays. Further, a video splitting function is provided within the transmitter so that the video signal can be sent to multiple displays thereby avoiding the need to provide a separate computer or media player to drive each display. Furthermore, a 50 m extension distance is usually suitable for typical digital signage applications. Yet further, equipment that does not require an additional power socket at the display(s) is also desirable as the installation is neater and the difficulty of installing and providing extra power sockets or supplies at display(s) is avoided. Hence, the video extension and line powering capabilities of the invention are very appropriate to digital signage applications.

Additionally, in digital signage applications, there can be a need to be able to monitor whether video has actually been displayed on the signs and is visible. Some digital signage playout software includes features to provide assurance that media, e.g. and advert, has been delivered to the video port of a computer for output to the display. However, there is no assurance that the video signal has actually reached the display or that the display is on or that the display is selected to the right input port. Providing confidence in delivery assurance of video to a displayed device is therefore important and not trivial.

Complex systems that use complicated optical sensors and complex video water marking techniques are available but are undesirable for typical applications due to the cost, inconvenience and complexity of operation. A simple low cost solution to this problem would therefore be very advantageous.

Hence, a further embodiment of the invention provides a solution by detecting the state of the display and video signal delivery and communicating this status information back to the transmitter for reporting to digital signage software. This in turn enables the signage software to have a much greater level of trust that video has actually been displayed and thus provides a more reliable system and service.

FIG. 8 shows a schematic block diagram of a signage system 800 according to a further embodiment of the invention. A signage player 801, either in the form of a general purpose computer with suitable signage software or a more dedicated device, is connected to a transmitter 820, similar to transmitter 112, via an HDMI cable 803. The signage player 801 is connected to a network 804 via network link 805. The signage player runs digital signage software 802 which is capable of communicating with other devices connected to the network 804. The signage software 802 may be an element of a larger system that includes management software running on one or more additional computers connected to the network 804 but the principle of operation is essentially the same regardless of whether the signage software 802 is running on the signage player 801 or on one or more management computers.

The transmitter 820 is generally similar to transmitter 112, but further includes a video splitter circuit 807 arranged to split the incoming video signal into two separate video signals and a microprocessor 806 that is connected to the network via a further network link 814. The data transmission apparatus further includes a first 808 and a second 809 receiver, generally similar to receiver 114. The first and second receivers 808, 809 are each connected to the transmitter 820 via respective first and second CATx cables 116, 116' which can typically be about 50 m long, thus delivering a potential separation distance between display devices of about 100 m. Each receiver 808, 809 is connected to a respective first 811 and second 812 digital display device using a respective HDMI cable 813, 813'. External power is supplied to the transmitter 820 by an external power cable 815 and the electrical power is in turn delivered to the receivers 808, 809 via the CATx cables 116, 116' as has previously been described.

Each receiver 808, 809 includes a microprocessor 810, 810' which is in communication with the respective displays 811, 812 via respective HDMI cables 813, 813' and the transmitter 820 via the respective CATx cables 116, 116'. Details of the system similar to that described above has been omitted for simplicity of explanation, and it can readily be understood from the above description that the transmitter microprocessor 806 can communicate with each of microprocessors 810, 810' in the receivers 808, 809 using the respective auxiliary signalling channels of the CATx links 116, 116'. Hence, any information that can be gathered about the state of the display devices 811, 812 and the video delivery thereto by microprocessors 810, 810' can readily be made available to microprocessor 806 within the transmitter 820.

FIG. 9 shows a schematic block diagram of parts of the circuitry 900 within a one of the receivers 808. Other elements of the receiver circuitry have been omitted for clarity of description. The receiver microprocessor 810 can communicate with the transmitter's microprocessor 807 via line drivers 911, the multiplexer 254 and the CATx cable 116 as previously above. Receiver 808 also includes a monitor detect circuit 901 which is attached to the pair of lines 903 transmitting the video clock signals and which can deliver a monitor detect signal over a line 902 to the microprocessor 810 that signals when clock pull down resistors are not connected.

FIG. 10 shows the monitor detection circuit 901 in greater detail. The monitor detection circuit is constructed using a simple resistor divider network 930 attached to the clock+ signal line and the clock− signal lines 903. By monitoring the voltage of the monitor detection signal output on line 902, the microprocessor can 810 determine if the HDMI cable is connected and powered on or not. The applicant has discovered that, for most displays, the voltage of the signal presented on this line can also be used to determine whether or not the display 811 currently has selected as its input, the input port that the receiver 808 is connected to.

As described above, the multiplexer circuit 254 includes a Maxim 3815 equaliser 905 which can also provide as an output signal, a video lock signal on a line 906 connected to processor 810 when the equaliser has locked on to a valid video signal. If the video lock signal is being asserted on line 906, then there is a high level of confidence that the video signal is being reliably received at the receiver 808 and, by implication, is being delivered to the display device 911. Furthermore, if the microprocessor 810 can read the EDID information from the display device 811 over a Display Data Channel (DDC) link of the HDMI cable 813 then there is a high degree of confidence that the HDMI cable is connected.

The microprocessor 810 is also able to control the DDC power signal over line 909 via a switch 908. If the DDC power signal is not supplied but the EDID data can still be read, there is a good indication that the display is powered on. Some displays also support the DDC command interface and the microprocessor can use this to interrogate the status of DDC-CI equipped displays.

Many HDMI sink devices implement Consumer Electronic Control (CEC) interfaces and the microprocessor 810 is configured to be able to communicate with the display 811 over the CEC interface. Using this interface the microprocessor can check various attributes of the display device. The CEC <Polling Message> and/or <Get CEC Version> command can be used to check that the display is connected and powered on. The CEC <Give Device Power Status> and read <Report Device Power Status> can be used to get the power status of the display (e.g. standby, on, etc.). At first connection, the CEC <Image View On> and <Active Source> commands can be used to determine if the display is connected to the interface that pixel data is being delivered to. A CEC <Routing Change> messages can be used to check for users switching the display to another input port. By using a combination of all these techniques the microprocessor 810 can determine with a high level of confidence that:
The HDMI cable is connected to the display;
The display is powered on;
The display's input is selected to the port that pixel data is being delivered to;
The receiver is receiving a valid video signal; and
The display is not in standby mode.

If all these are true then there is a high degree of confidence that an item of video content being generated by the digital signage software 802 is actually being displayed on the screens 811 and 812. This information, when coupled with the signage software's own "proof of playout" features provides the operator of the signage system with a greater level of delivery assurance. Hence, this embodiment of the invention enables this display assurance information to be delivered within a simpler signage distribution system 800.

Figure 11:
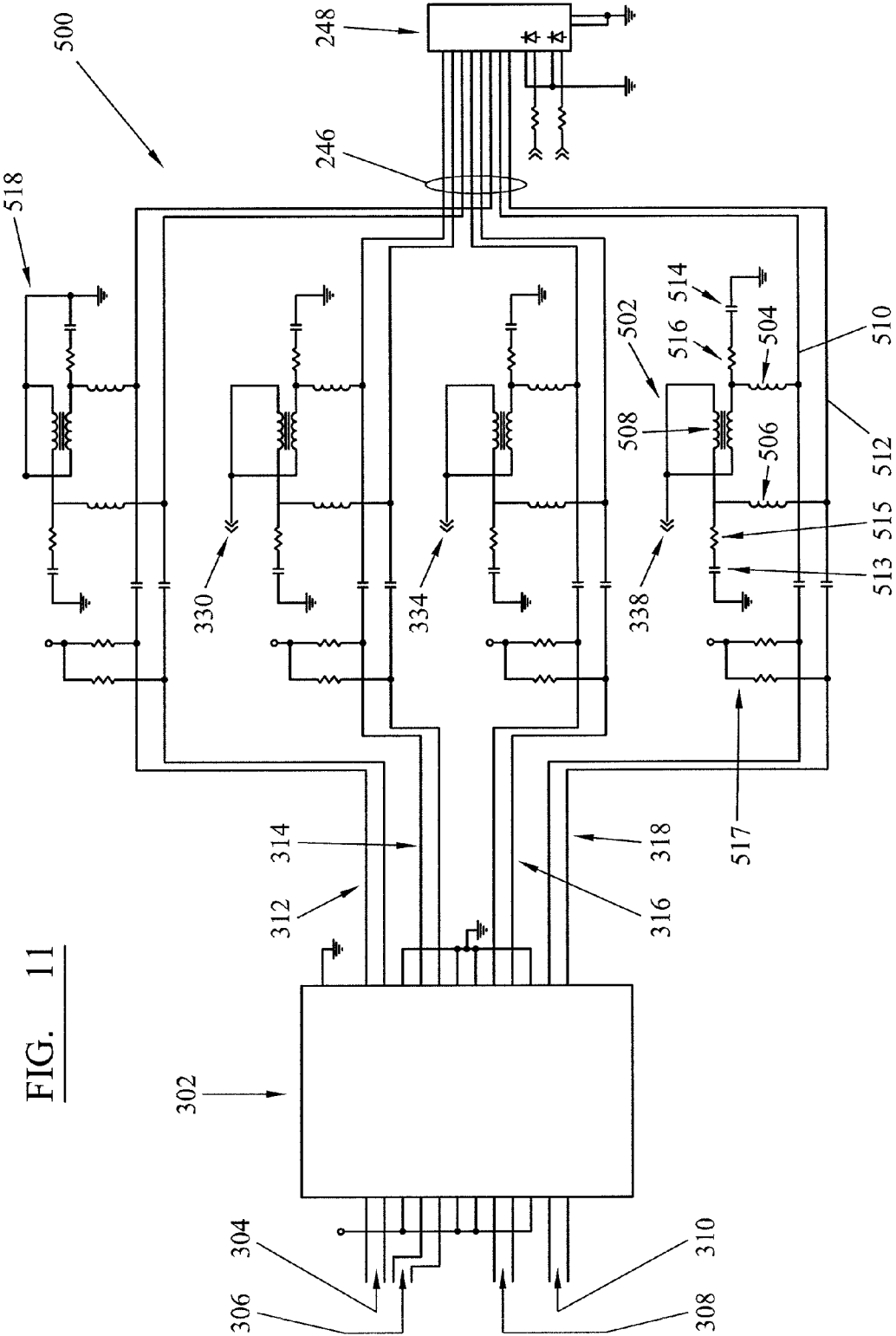
FIG. 11 shows a schematic circuit diagram of a further embodiment of a multiplexer part of the circuitry of the transmitter.
Figure 12:
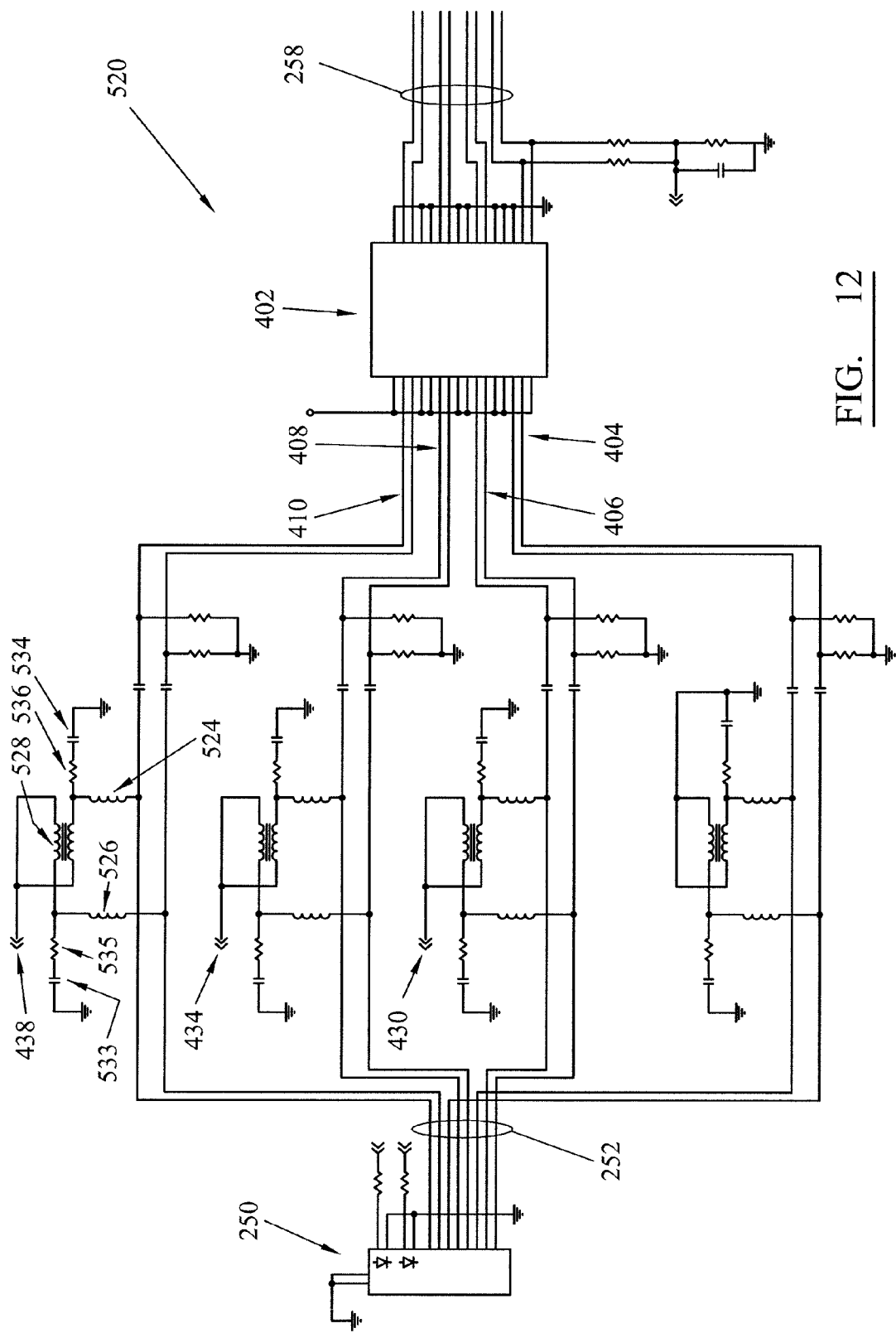
FIG. 12 shows a schematic circuit diagram of a further embodiment of a multiplexer part of the circuitry of the receiver.

FIGS. 11 and 12 respectively show schematic circuit diagrams of a further embodiment of parts 500, 520 of the multiplexer part of the circuitry of the transmitter and receiver, similar to those shown in FIGS. 4 and 5. However, the network that is used to inject data or power signals, and remove them, from the CATx twisted pairs is different. The windings still have a common mode choke wired in anti-phase arrangement, e.g. 502 corresponding to 336 in FIG. 4. However, an inductor has been connected between each twisted pair line and the common mode choke, along with a capacitor and resistor, to improve the separation between low and high frequency signals and maintain the separation over a wider range of frequencies. This in turn helps to improve the extension capabilities of the invention, i.e. being able to effectively transmit signals over greater lengths of twisted pairs and hence greater distances.

Specifically, a respective inductor 502, 504 is introduced into the connection of each winding of the transformer arrangement 508 to the Data+ differential signal lines 510, 512. These inductors 502, 504 handle the higher frequency part of the signals which allows the choke arrangement 508 to be optimised for the lower frequency part of the signals. The TMDS signal has both high frequency and low frequencies in it. While the invention can operate as illustrated in FIGS. 4 and 5, it has been found that the performance of the invention can be improved by optimising the performance of the choke 508 for the lower frequency signals and the inductors optimised to handle the higher frequency signals (or vice versa). Inductors 504 and 506 can be arranged to have low self-capacitance, i.e. to be long and thin, so as to avoid stray capacitance, but this results in low inductance and so is not optimal for the low frequency signals. Therefore, it can be preferred for the inductors to be arranged to handle the higher frequency TMDS signals and the choke arranged to handle the lower frequency signals.

The network for injecting/removing signals 502 also includes a capacitor 513, 514 and a resistor 515, 516 connected in series between each winding of the choke and ground. These elements are provided to mitigate the effects of stray reactances in the network as a whole. Without these elements, there would be ringing on the sharp edges of the waveform. These elements act to damp down any ringing so as to give better signal integrity thereby improving the ability to detect the signals and so allowing signals to be transmitted over greater distances.

Also, in this embodiment, the value of each of the resistors 517 providing absorption of reflections is set at about 100 Ohms.

Both the Data− signal 330 network and the line power signal 334 network are modified similarly to the Data+ signal network by the addition of corresponding inductors, resistors and capacitors.

Although the clock network 518 is shown having a similar topology, in practice the inductors can be omitted and replaced with a zero ohm link as the clock signal does not have high and low frequency components similar to the TMDS signal, but rather is just a constant stream of pulses. The resistors and capacitors of the clock network 518 corresponding to 513, 514 and 515, 516 can also be omitted (as indicated by DNF (Do Not Fit)). However, in other embodiments these components can also be included and so preferably a circuit board can be designed to allow their easy incorporation.

The receiver circuitry show in FIG. 12 is modified similarly to the transmitter circuitry shown in FIG. 11, by the addition of corresponding inductors 524, 526, capacitors 533, 534 and resistors 535, 536 to the networks for injecting/removing the data and power signals and optionally for the clock signal.

Figure 13:
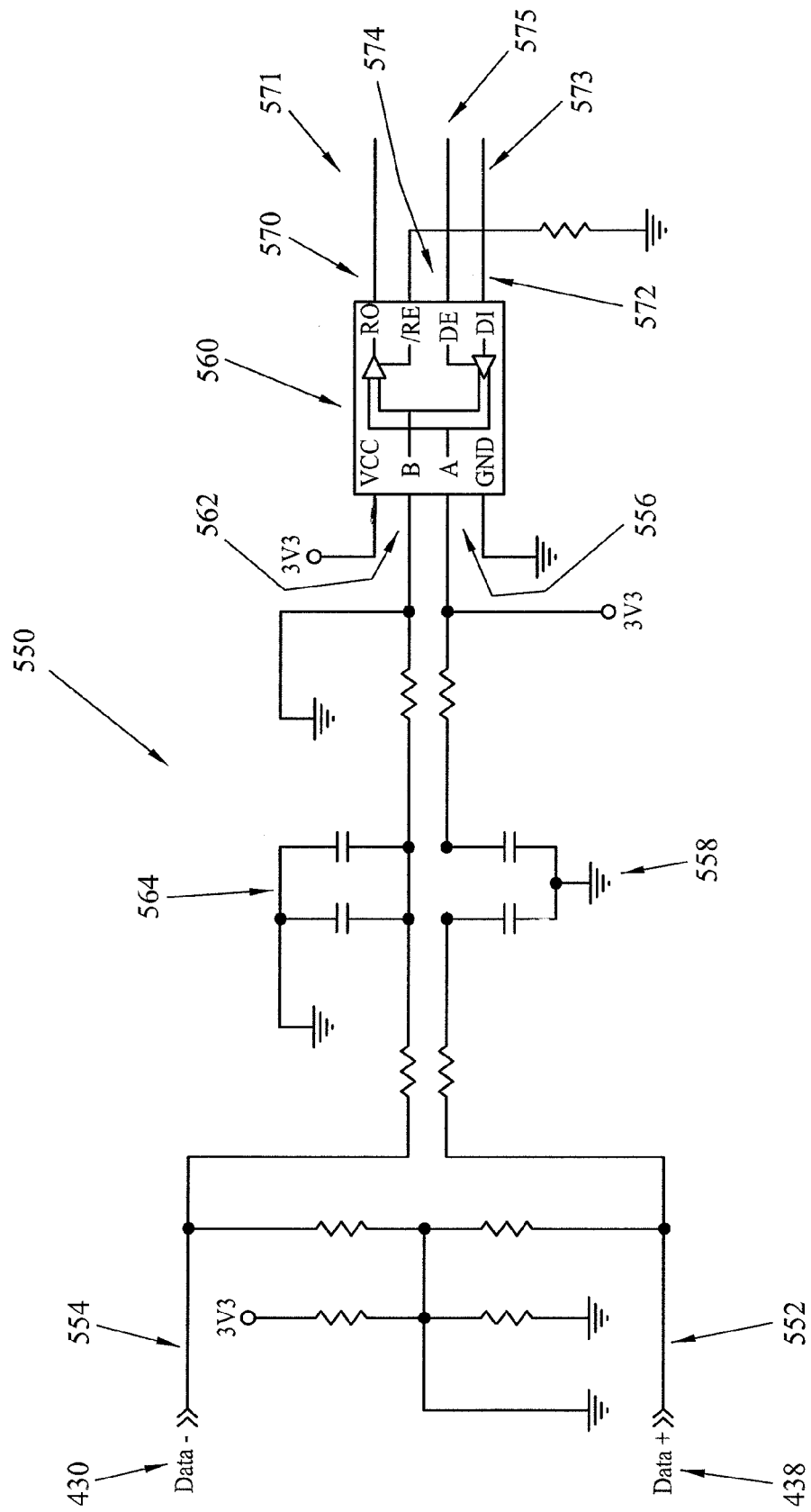
FIG. 13 shows a schematic circuit diagram of a data communication part of the circuitry of the receiver.

FIG. 13 shows a schematic circuit diagram of a data communication part 550 of the circuitry of the receiver 114. A similar corresponding circuit is provided in the transmitter 112. The data communication part 550 includes a line 552 for the Data+ signal 438 and a line 554 for the Data− signal. The data communication part 550 operates as a half-duplex device in which the data communication channels direction is switched according to a protocol administered by a microprocessor (not shown). Data communication takes place in only one direction at any given time and therefore no hybrid line termination circuitry is required as is the case in embodiments in which duplex communication is used, i.e. simultaneous bi-directional data communication. As a hybrid is not needed in the half-duplex approach, this makes it easier to reduce any interaction between the video and data channels.

The Data+ line 552 is connected to a terminal 556 of a transceiver 560 via a filter network 558. Similarly, the Data− line 554 is connected to a terminal 562 of the transceiver 560 via a filter network 564. Each of filter networks 558, 564 comprises resistors and capacitors, with a resistor on each side of the capacitor network so as to filter signals passing in each direction. Each filter network 558, 564 is arranged to prevent high frequency components of the data signal from getting onto the video signal and in the reverse direction to prevent video components getting onto the data signal. A suitable device for the transceiver 560 is the ISL3178E half-duplex transceiver as provided by Intesil Corporation.

The transceiver 560 also includes a terminal 570 for a received data signal 571, a terminal 572 for a transmit data signal 573 and a terminal 574 for a change transmission direction signal 575. The received data signal 571, transmit data signal 573 and direction change signal 575 are provided from or to the microcontroller which administers the half duplex communication protocol. The data communications circuitry 550 is provided as a part of the MUX 254 of the receiver 114. A corresponding circuit, with appropriate changes, is provided as a part of the MUX 226 of the transmitter 112 in order to provide the other end of the data communications channel.

The invention claimed is:

1. Apparatus for transmitting digital video data and auxiliary data over a four twisted wire pair cable, comprising:
   a transmitter including differential mode circuitry arranged to transmit a first, second and third digital video colour signal and a digital video timing signal as differential mode signals over the four twisted wire pair cable; and
   a receiver including differential mode circuitry arranged to receive the differential mode signals, and
   wherein the transmitter and the receiver further include common mode circuitry arranged to provide a data channel for sending auxiliary data between the transmitter and the receiver using common mode signalling over selected first and second twisted wire pairs of the four twisted wire pairs of the cable, the common mode circuitry including, at the transmitter, a first common mode choke connected to the first twisted wire pair and a second common mode choke connected to the second twisted wire pair, the first and second common mode chokes each being wired in antiphase, the common mode circuitry further including, at the receiver, a third common mode choke connected to the first twisted wire pair and a fourth common mode choke connected to the second twisted wire pair, the third and fourth common mode chokes each being wired in antiphase, and
   wherein the first, second, third and fourth common mode chokes are arranged to insert or extract auxiliary data signals onto or from the selected first and second twisted wire pairs and to output the auxiliary data signals extracted using said common mode chokes.

2. Apparatus as claimed in claim 1, wherein the transmitter includes four common mode chokes wired in antiphase, each connected to a different one of the twisted wire pairs arranged to transmit different ones of the digital video colour signals and the digital video clock signal.

3. Apparatus as claimed in claim 1, wherein the receiver includes four common mode chokes arranged to insert or extract auxiliary data signals, each connected to a different one of the twisted wire pairs arranged to receive different ones of the digital video colour signals and the digital video clock signal.

4. Apparatus as claimed in claim 1, wherein the transmitter includes a fifth common mode choke wired in anti-phase and a sixth common mode choke wired in anti-phase connected respectively to third and fourth twisted wire pairs of the four twisted wire pairs of the cable, and the receiver includes a seventh common mode choke wired in anti-phase and an eighth common mode choke wired in anti-phase respectively connected to the third and fourth twisted wire pairs and, wherein the common mode circuitry of the transmitter is further arranged to send a power signal using common mode signaling over the third and fourth twisted wire pairs of the four twisted wire pairs of the cable.

5. Apparatus as claimed in claim 1, wherein each of the transmitter and the receiver includes four twisted wire pairs each for handling a respective one of the digital video colour and digital video timing signals.

6. Apparatus as claimed in claim 5, wherein each line of each twisted wire pair includes a capacitive element to provide AC coupling.

7. Apparatus as claimed in claim 5, wherein each line of each twisted wire pair of the transmitter includes a resistive element arranged to at least partially absorb signals reflected back to the transmitter along the cable to be used with the apparatus.

8. Apparatus as claimed in claim 1, wherein the common mode circuitry is arranged to provide a USB data channel.

9. Apparatus as claimed in claim 8, wherein each of the transmitter and the receiver includes circuitry arranged to extract data from a USB data signal and pass the extracted data to the common mode circuitry for transmission over the auxiliary data channel.

10. Apparatus as claimed in claim 8, wherein each of the transmitter and the receiver includes circuitry arranged to receive data from the common mode circuitry and to reconstitute a USB data signal including the received data.

11. Apparatus as claimed in claim 1, wherein the auxiliary data is digital rights management data.

12. Apparatus as claimed in claim 11, wherein the auxiliary data is HDCP data.

13. Apparatus as claimed in claim 1, wherein the digital video data is HDMI or DVI.

14. Apparatus as claimed claim 1, further comprising a four twisted wire pair cable connected between the transmitter and receiver.

15. Apparatus as claimed in claim 14, wherein the transmitter includes a cable connector, the receiver includes a cable connector, a first end of the cable includes a first cable connector and a second end of the cable includes a second cable connector.

16. Apparatus as claimed in claim 14, wherein the cable is a CATx cable.

17. Apparatus as claimed in any of claims 1, wherein the cable has a length of at least 50 m.

18. Apparatus as claimed in claim 1, and further comprising:
a further transmitter; and
a switching device, wherein the transmitter and further transmitter are each connected to the switching device by respective further four twisted wire pair cables and the receiver is connected to the switching device by the twisted wire pair cable.

19. Apparatus as claimed claim 1, and further comprising:
a further transmitter;
a further receiver; and
a switching device, wherein the transmitter and further transmitter are each connected to the switching device by respective further four twisted wire pair cables, the receiver is connected to the switching device by the twisted wire pair cable and the further receiver is connected to the switching device by a yet further four twisted wire pair cable.

20. Apparatus as claimed in claim 1, and further comprising a further receiver, and wherein the transmitter includes a video splitter arranged to split the digital video signal into separate digital video signals for transmission to each of the receivers.

21. Apparatus as claimed in claim 20, wherein each of the receivers is configured to interrogate an attached display device to determine one or more attributes relating to the status of the device and to transmit the determined attribute to the transmitter over the auxiliary data channel.

22. Apparatus as claimed in claim 21, wherein the one or more attributes are selected from: whether a cable is connected to the display; whether the display is powered on; whether the a currently selected input port of the display is the port to which digital video data is being delivered; and whether the display is in standby mode.

23. Apparatus as claimed in claim 20, wherein each receiver further comprises video lock circuitry to determine whether a video signal is being reliably received from the transmitter.

24. Apparatus as claimed in claim 20, wherein each receiver further comprises monitor detection circuitry to determine whether a display device is connected to the receiver.

25. Apparatus as claimed in claim 1, and further comprising a respective inductor connected between each common mode choke wired in anti-phase and a signal line of the respective twisted wire pairs.

26. Apparatus as claimed in claim 25, wherein the inductor is arranged to handle signals having a different frequency to signals handled by the common mode chokes wired in anti-phase.

27. Apparatus as claimed in claim 26, wherein the inductor handles signals having a higher frequency than the signals handled by the common mode choke wired in anti-phase.

28. Apparatus as claimed in claim 1, and further comprising a respective resistor and capacitor network coupled between each respective common mode choke wired in anti-phase and ground and arranged to reduce the effect of stray reactances.

29. Apparatus as claimed in claim 28, wherein the respective resistor and capacitor networks are further arranged to reduce ringing and/or improve signal integrity.

30. A signage system comprising:
a data processing device including a signage application;
a first display device;
a second display device; and
apparatus as claimed in claim 20, wherein the transmitter is connected to the data processing device, the first display is connected to the receiver and the second display is connected to the further receiver.

31. A system comprising:
at least one source of digital video data;
at least one sink of digital video data; and
apparatus as claimed in claim 1, wherein one source is connected to the or each transmitter and one sink is connected to the or each receiver.

32. A method for transmitting digital video data and auxiliary data over a four twisted wire pair cable, comprising:
transmitting a first, second and third digital video colour signal and a digital video timing signal using differential mode signalling over a first, second, third and fourth twisted wire pair of a cable; and
sending auxiliary data over a data channel using common mode signalling over a first pair of twisted wire pairs of the four twisted wire pairs of the cable, wherein a first common mode choke wired in anti-phase and a second common mode choke wired in anti-phase are used to insert or extract a signal for sending auxiliary data from the first pair of twisted wire pairs of the four twisted wire pairs, with each twisted wire pair of the first pair of twisted wire pairs also being used to transmit one of the digital video colour or digital video timing signals, wherein the auxiliary data signal inserted onto or extracted from the first pair of twisted wire pairs of the four twisted wire pairs is only inserted onto or extracted from the first pair of twisted wire pairs of the four twisted wire pairs; and
auxiliary data signals extracted using such common mode chokes wired in anti-phase is output from the common mode chokes wired in antiphase.

33. The method of claim 32, further comprising:
sending a power signal using common mode signalling over a second pair of twisted wire pairs of the four twisted wire pairs of the cable different from the first pair of twisted wire pairs, wherein a third common mode choke wired in anti-phase and a fourth common mode choke wired in anti-phase are connected to the second pair of twisted wire pairs.

34. The method of claim 32, wherein the data channel provides a data channel for USB data.

35. The method of claim 32, wherein the data channel provides a data channel for digital rights management data.

36. The method of claim 32, wherein the data channel provides a data channel display device status data.

37. The method of claim 32, wherein a respective inductor is connected between each common mode choke wired in anti-phase and a signal line of the respective twisted wire pairs.

38. The method of claim 32, wherein a respective resistor and capacitor network is coupled between each respective common mode choke wired in anti-phase and ground and arranged to reduce the effect of stray reactances.

\* \* \* \* \*